United States Patent [19]

Hwang

[11] Patent Number: 4,997,320

[45] Date of Patent: Mar. 5, 1991

[54] TOOL FOR FORMING A CIRCUMFERENTIAL PROJECTION IN A PIPE

[76] Inventor: Biing-Yih Hwang, 89, Lin Yen South Rd., Lin Yen Shian, Kaohsiung Hsien, Taiwan

[21] Appl. No.: 461,095

[22] Filed: Jan. 4, 1990

Related U.S. Application Data

[63] Continuation-in-part of Ser. No. 395,513, Aug. 18, 1989, abandoned.

[51] Int. Cl.$^5$ .............................................. B23B 45/00
[52] U.S. Cl. ......................................... 408/22; 7/157; 72/370; 72/393
[58] Field of Search ................. 408/22, 199; 72/370, 72/393; 29/523; 7/157

[56] References Cited

U.S. PATENT DOCUMENTS

| | | | |
|---|---|---|---|
| 3,103,068 | 9/1963 | Hinz et al. | 72/393 |
| 3,640,115 | 2/1972 | Duncan et al. | 72/393 |
| 3,947,950 | 4/1976 | Adams | 72/393 |
| 4,512,178 | 4/1985 | Blevins et al. | 72/393 |

FOREIGN PATENT DOCUMENTS

| | | | |
|---|---|---|---|
| 150015 | 4/1904 | Fed. Rep. of Germany | 72/393 |
| 2137797 | 2/1973 | Fed. Rep. of Germany | 72/393 |
| 277711 | 8/1970 | U.S.S.R. | 72/393 |
| 804927 | 2/1981 | U.S.S.R. | 72/393 |

Primary Examiner—Daniel W. Howell
Attorney, Agent, or Firm—Larson and Taylor

[57] ABSTRACT

A tool comprising a turning bar, a pipe supporter, a handle to turn the pipe supporter and a turning disc to rotate the turning bar. The turning bar fits and rotates in the central hole in the pipe supporter and forces two steel balls to move outward in two opposite sidewise holes in the pipe supporter with the lower tapered portion thereof. Then then handle is moved to rotate the pipe supporter in relation to a pipe fitted around the pipe supporter, allowing the steel balls to compress outward the inner surface of the pipe to form a circumferential projection thereon.

2 Claims, 7 Drawing Sheets

TOOL FOR FORMING A CIRCUMFERENTIAL PROJECTION IN A PIPE

This is a continuation-in-part application of Ser. No. 07/395,513 filed Aug. 18, 1989, now abandoned.

BACKGROUND OF THE INVENTION

The object of this invention is to improve the U.S. patent application of Ser. No. 07/395,513 of the same title filed by this applicant. The No. 07/ 395,513 application comprises a turning bar 1 which is magnetized to keep steel balls 22 in the sidewise holes 23. Turning bar 1 forces said balls to move outward to push against the inner surface of a pipe, to form a circumferential projection as a pipe supporter is turned around. But the contacting dimension of the bar 1 with the balls 22 is quite small, and if the magnetism is not enough, the balls 22 can easily fall out. To improve this defect, this invention has been devised.

SUMMARY OF THE INVENTION

This invention comprises a turning bar, a pipe supporter, a handle, and a turning disc as the main parts, made of a very hard metal such as chromium-molybdenum steel or nickel-chromium steel.

The turning bar is provided with a tapered portion at the bottom, a threaded portion at the upper section to screw with a threaded portion of the pipe supporter, and two opposite flat surface portions at the top to combine with a turning disc. The turning bar, confined by a threaded ring, can rotate in the pipe supporter. The turning bar can also move up and down guided by the threaded ring so that the lower tapered portion can force two steel balls in two sidewise holes to move outward. The steel balls are prevented from falling out by two springs, and can move through the gap between the spring wires to push against the inner surface of a pipe fitted around the outer surface of the pipe supporter. The handle is moved to rotate the pipe supporter in relation to the pipe, allowing the balls to form a circumferential projection in a pipe.

BRIEF DESCRIPTION OF THE DRAWINGS

This invention will now be described in detail with reference to accompanying drawings wherein.

DETAILED DESCRIPTION OF THE INVENTION

Figure 1:
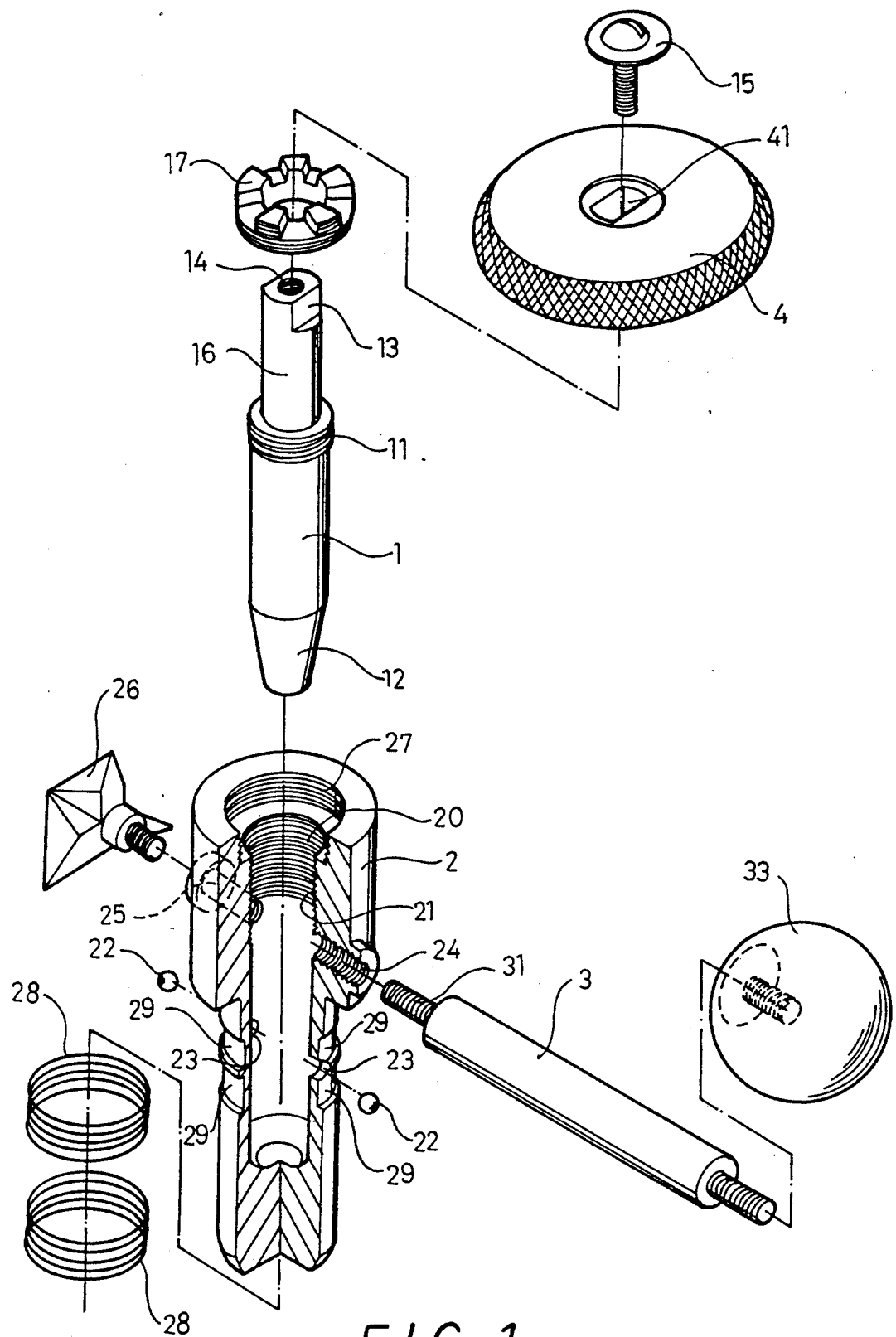
FIG. 1 is an exploded perspective view of the first example of the tool for forming a circumferential projection in a pipe according to the present invention.

This invention, as shown in FIG. 1, comprises a turning bar 1, a pipe supporter 2, a handle 3 and a turning disc 4 as its main parts.

The turning bar 1 is made of chromium-molybdenum steel or nickel-chromium-molybdenum steel which has been heat treated. The turning bar 1 is provided with a tapered section 12 at the bottom, a threaded portion 11 at the upper part of the intermediate straight section having a large diameter which threaded portion is used for screwing with a threaded portion 21 of the pipe supporter 2, two opposite flat surfaces 13 at the top to fit in an oval hole 41 in the turning disc 4, and a threaded hole 14 in the top for a bolt 15 to combine the ,turning disc 4 and the turning bar 1 together. In addition, said bar 1 has a small diameter section 16 at the upper end for a male-threaded ring 17 to pass around to screw with a female-threaded portion 27 of the pipe supporter 2. Thus, the turning bar 1 may rotate in the central hole in the ring 17 and is also confined not to move upward out of pipe supported 2 by the ring 17 so that steel balls never fall in the bar hole 20.

The pipe supporter 2 is made of a metal, and is provided with the central lengthwise bar hole 20 for the turning bar 1 to fit into and rotate therein. The bar hole 20 has a female-threaded portion 27 at the upper end and another female-threaded portion 21 under the threaded portion 27. The threaded portion 21 engages the male-threaded portion 11 of the turning bar 1 and the threaded portion 27 engages the threaded ring 17. In addition, the pipe support 2 is provided with two opposite sidewise holes 23 at the lower section of the bar hole 20 for steel balls 22 to pass through. The steel balls are confined therein and are prevented from falling out by two springs 28 put around in two ring grooves 29 provided on the outer surface of the pipe supporter 2. The pipe supporter 2 also has a sidewise threaded hole 24 just below the threaded portion 21 for a handle 3 to screw with. It should be appreciated that said springs 28 have the same outer diameter as the pipe supporter 2. The lower section of the pipe supporter 2 has a straight surface to fit into the inner diameter of a pipe, so different sized pipe supporters 2 have to be prepared for different sized pipes. In addition, a cutter 26 is screwed in a sidewise threaded hole 25 in the pipe supporter for smoothing the cut edge of a pipe.

The handle 3 has a threaded portion 31 at one end to screw with the threaded hole 24 in the pipe supporter 2 and another threaded portion at the other end for screwing with a knob 33 so that the pipe supporter 2 can be easily rotated by the handle 3.

The turning disc 4 is made of a metal, and is provided with a central oval hole 41 to receive the top portion with two opposite flat surfaces 13 of the turning bar 1. Turning disc 4 is then combined with said bar 1 securely with the bolt 15 screwing in the threaded hole 14.

Figures 2, 3:
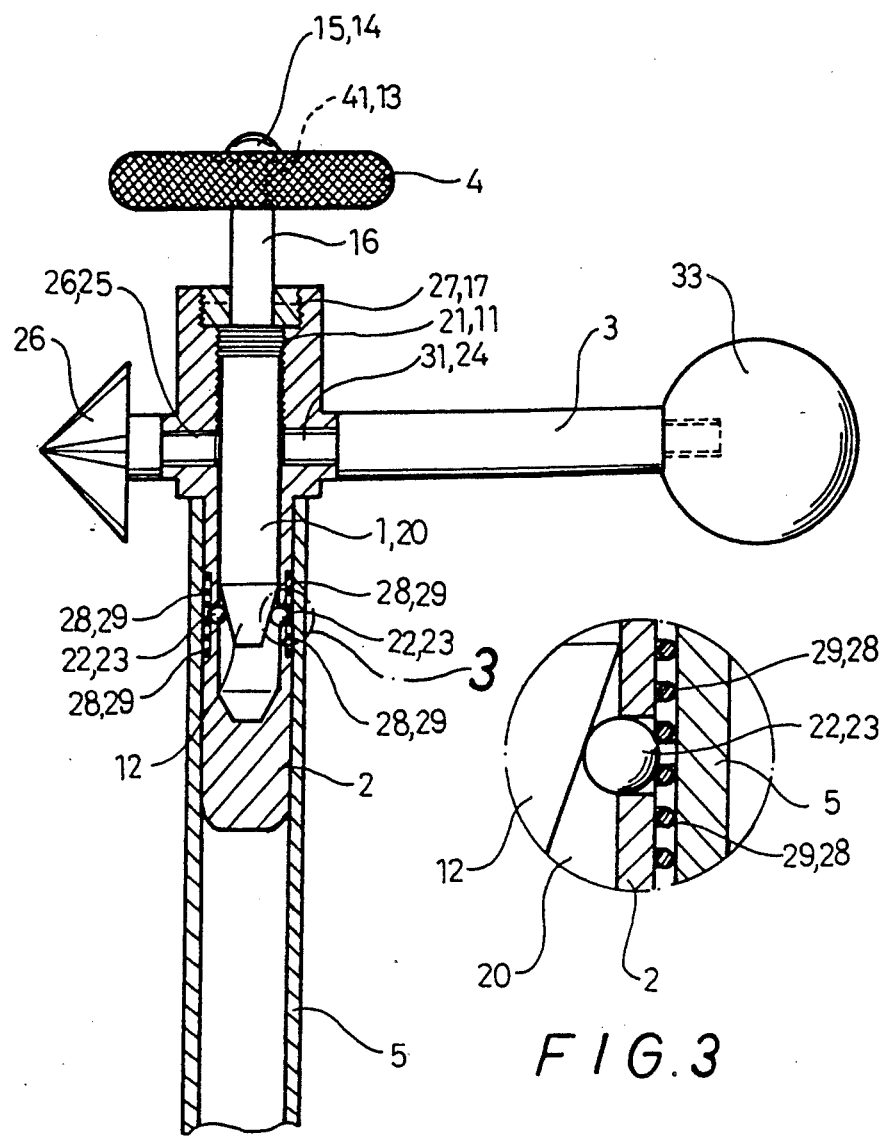
FIG. 2 is a cross-sectional view of the first example of the tool for forming circumferential projection in a pipe according to the present invention.
FIG. 3 is an enlarged view of the section 3 in FIG. 2.
Figures 4, 5:
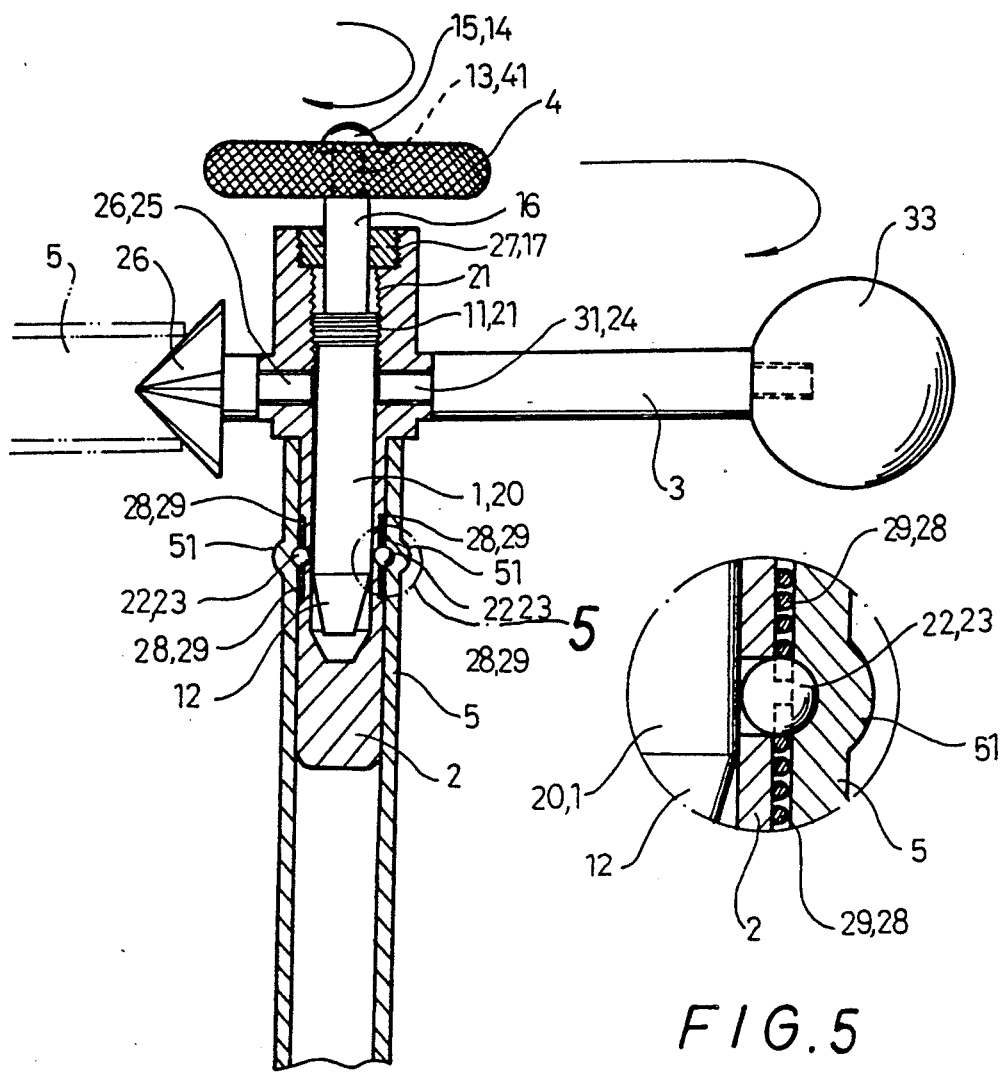
FIG. 4 is a cross-sectional view of the first example of the tool for forming circumferential projection in a pipe in practical use.
FIG. 5 is an enlarged view of the section 5 in FIG. 4.

Referring to FIG. 2, the turning bar 1 is confined and kept by the threaded ring 17 in position in the central hole 20 in the pipe supporter 2 so that the bar 1 can rotate by the turning disc 4 on the center line. Accordingly, the tapered portion 12 can also move down gradually owing to the mutual engagement of the threaded portions 11 and 21 so that the steel balls 22 may be forced to move outward through the gap between the two springs 28. Then the balls 22 push against the inner surface of a pipe 5 fitted around the lower section of the pipe supporter 2, and the handle 3 is moved to rotate the pipe supporter 2 in relation to the pipe fitted on the supporter 2. This forces the balls 22 to form a ring protrusion 51 on the wall of the pipe 5 as shown in FIG. 4.

The structure in this invention can always hold the balls 22 in the holes 23 without falling out, and has the turning bar 1 provided with the threaded portion at the large diameter section so that the torque the bar 1 can endure is comparatively large to avoid breaking in action.

Figure 6:
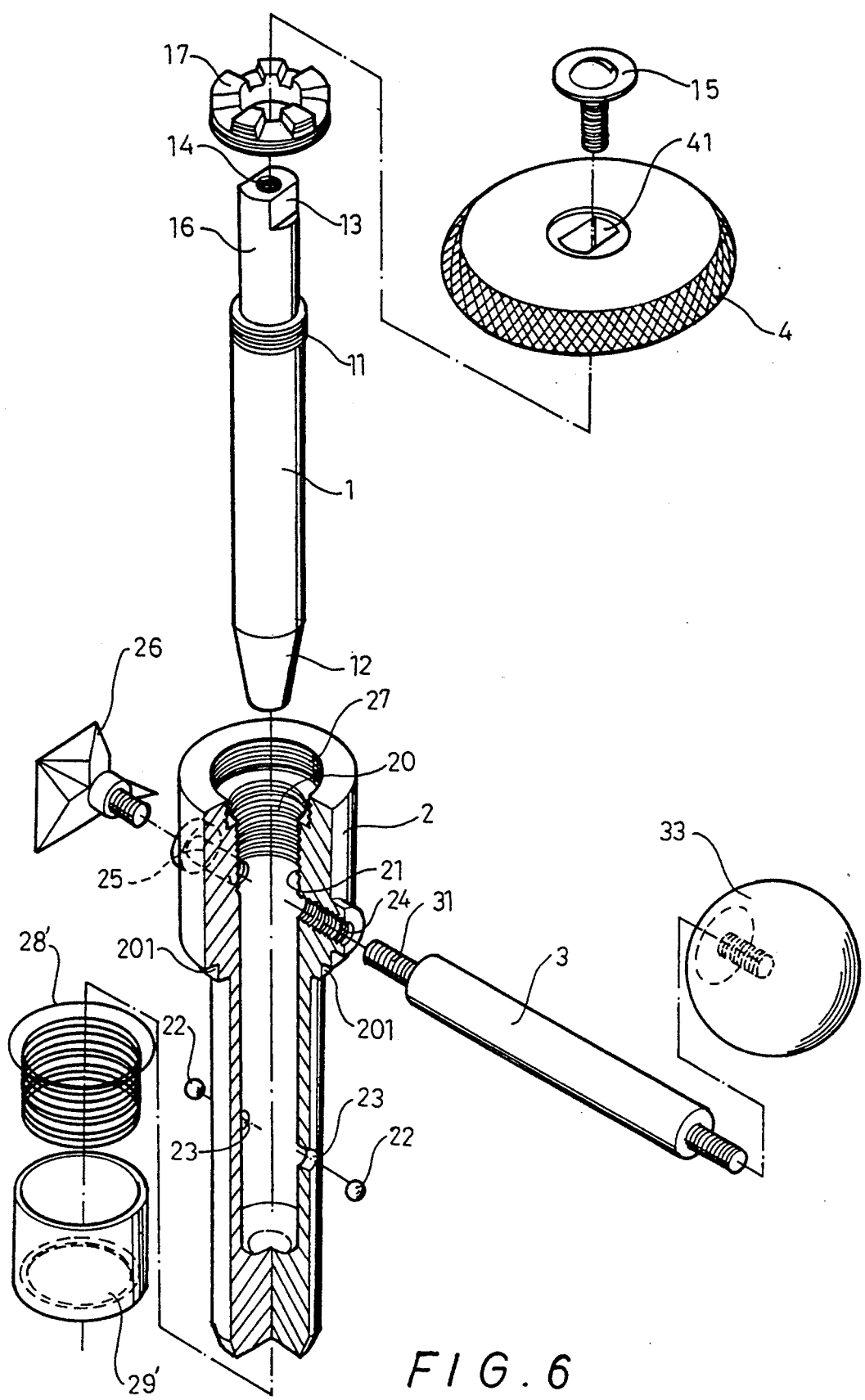
FIG. 6 is an exploded perspective view of the second example of the tool for forming a circumferential projection in a pipe according to the present invention.
Figure 7:
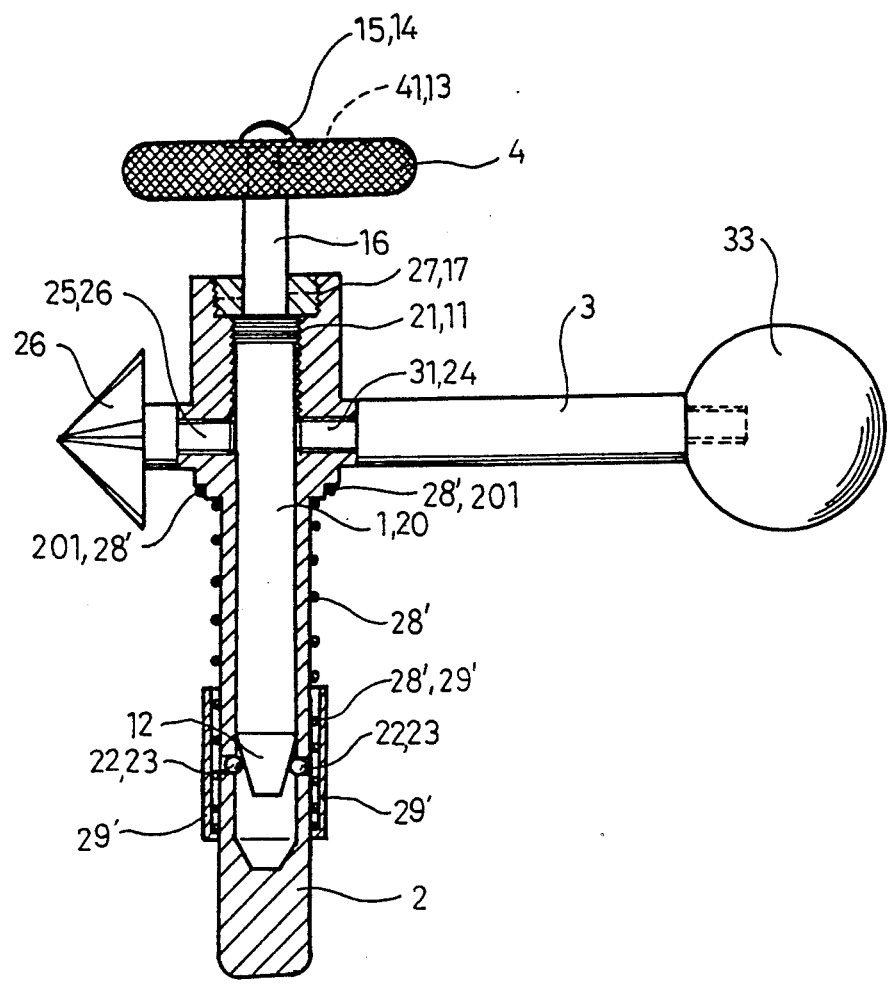
FIG. 7 is a cross-sectional view of the second example of the tool for forming a circumferential projection in a pipe according to the present invention.

Next, FIG. 6 shows the second example of the invention, wherein another structure for preventing the steel balls 22 from falling out is furnished. It also includes a turning bar 1, a pipe supporter 2, a handle 3 and a turning disc 4. The handle 3 and the turning disc 4 are all the same as the first example, but the turning bar 1 has a longer length and the pipe supporter 2 has a lower small diameter section of different size to fit in a different inner diameter of pipes. A separate spring 28' and a separate positioning ring 29' are provided to fit tightly around said lower portion to prevent the balls 22 from out of the sidewise holes. The upper end of the spring 28' is welded at a stair portion 201 of the pipe supporter 2 and the lower end welded at the inner bottom of the ring 29' as shown in FIG. 7. So when the spring, 28' lengthens with the ring 29' pulled down, the ring 29' surrounds the holes 23, stopping the balls 22 from falling off.

Figure 8:
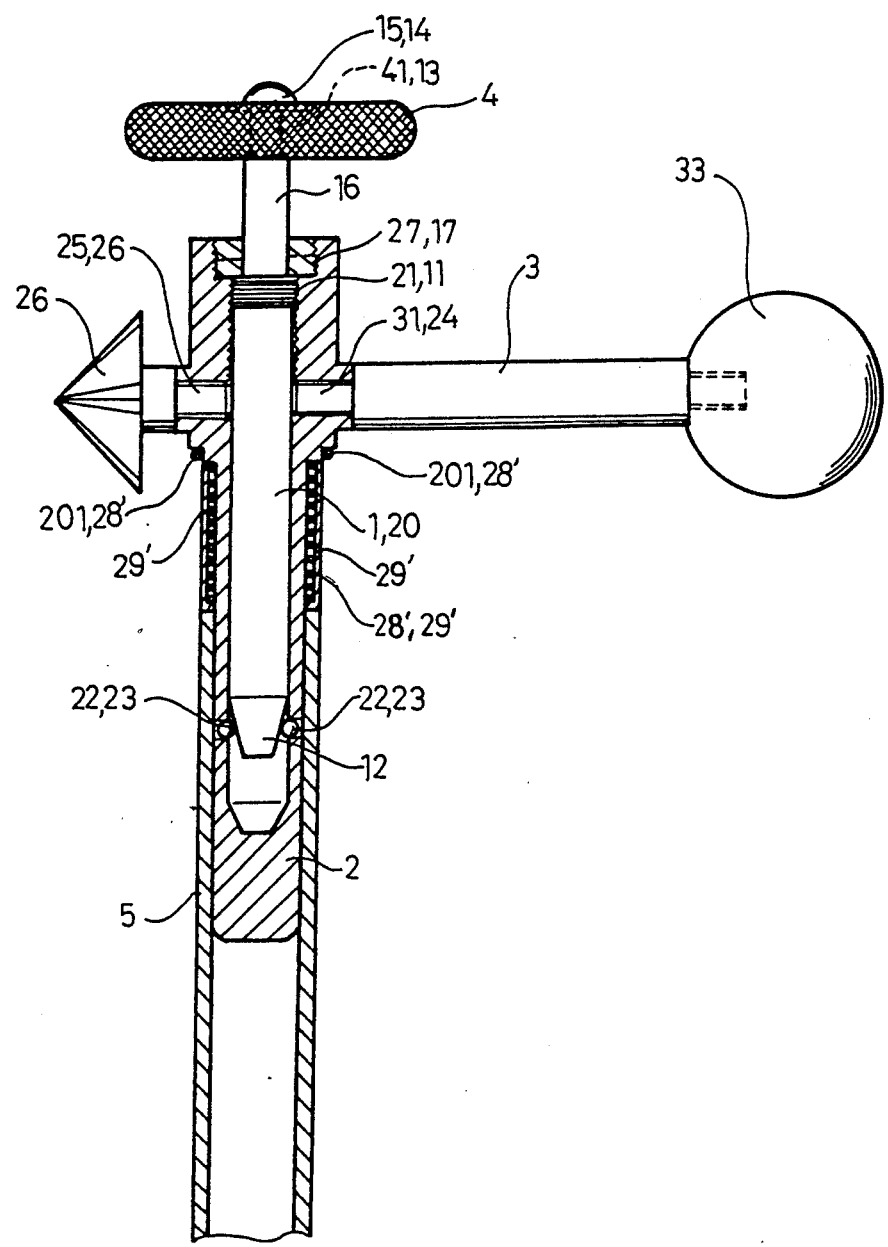
FIG. 8 is a cross-sectional view of the second example of the tool for forming a circumferential projection with a pipe to be processed fitted thereon.
Figure 9:
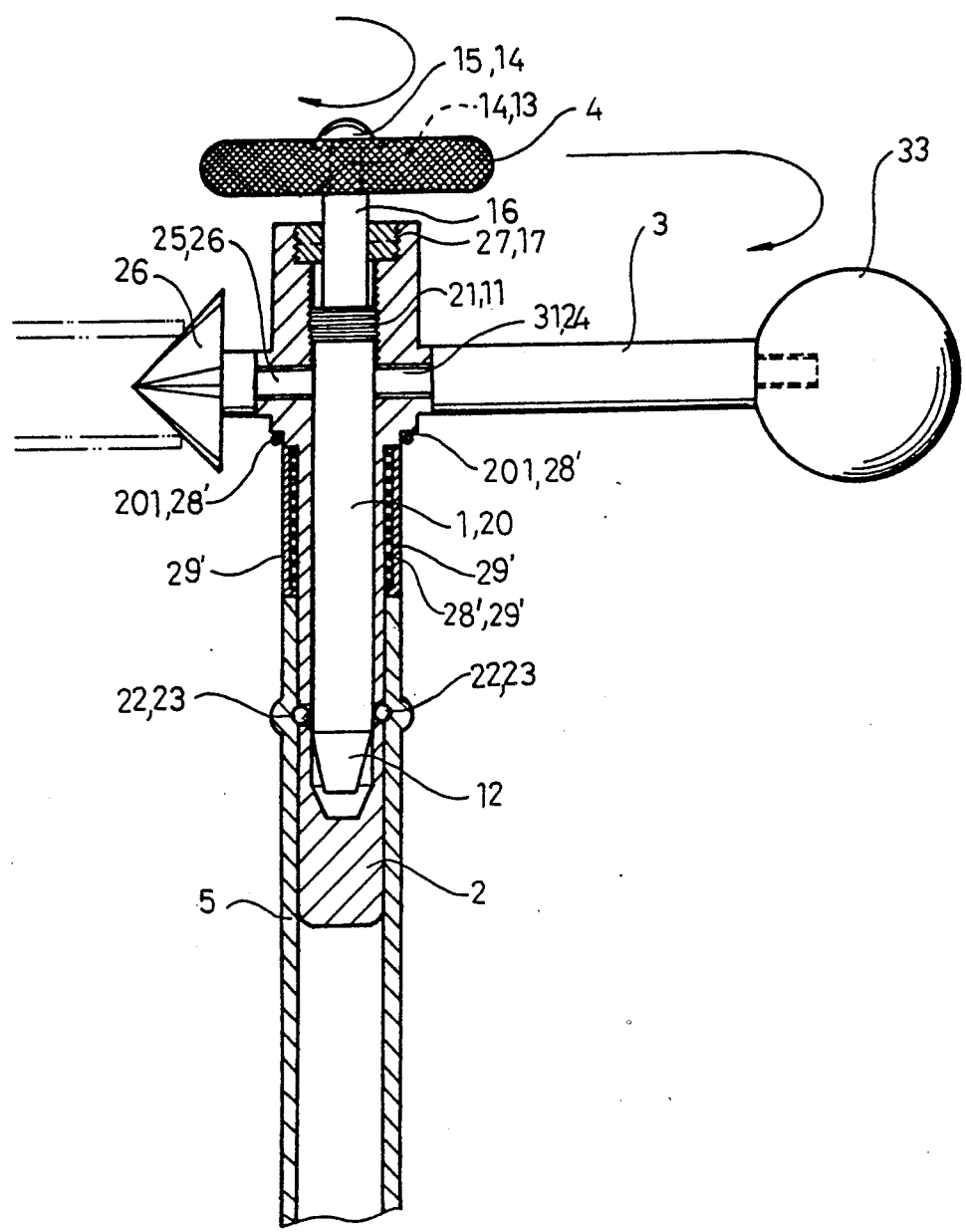
FIG. 9 is a cross-sectional view of the second example of the tool for forming a circumferential projection with a pipe fitted thereon and the turning bar being rotated.

To process a pipe 5, the ring 29' can be pushed upward by the end of the pipe 5 being fitted around and pushed up along the lower section of the pipe supporter 2 as shown in FIG. 8. Thus, the spring 28' is forced to shrink upward, leaving ring 29 ' away from the holes 23. Therefore, the balls 22 can be forced half out of the holes 23 to push the inner surface of the pipe 5 by the tapered portion of the turning bar 1 as shown in FIG. 9 when the turning bar 1 is rotated to move downwards. After the projection in pipe 5 is finished pipe 5 is withdrawn from the lower section of the pipe supporter 2, and the bar 1 is moved up. The positioning ring 29' then naturally falls down to surround the holes 23, elastically pushed by the spring 28', so the balls can never fall out of the holes 23.

In short, the two examples in this invention can always hold the steel balls 22 in the sidewise holes 23 without falling out so that pipe processing work can be smoothly performed, speeding up pipe joining work and with firmness as well.

What is claimed is:
1. A tool for forming a circumferential projection in a pipe comprising:
   a turning bar including a first threaded portion (11), a smaller diameter upper portion with an oval upper end, and a tapered portion (12) at a lower end thereof;
   a pipe supporter including
      (a) a central bar hole (20) in which said turning bar is received, said bar hole including (i) a second threaded portion (21) which engages said first threaded portion (11) of said turning bar and (ii) a third threaded portion (27) above said second threaded portion (21),
      (b) an upper part which remains outside of the pipe including (i) a first sidewise threaded hole (24) and (ii) a second sidewise threaded hole (25), and
      (c) a lower part which is received in the pipe including (i) two opposite sidewise holes (23) disposed to be opposite said tapered portion (12) of said turning bar, each said opposite sidewise hole (23) having a steel ball disposed therein which is engageable by said tapered portion (12), (ii) two ring grooves provided on an outer surface of said pipe supporter with one said ring groove above and one said ring groove below a center of said opposite sidewise holes (23), and (iii) two springs, a respective said spring being disposed in a respective said ring groove such that said springs normally prevent said balls from passing outward through a respective said opposite sidewise hole (23) but said springs are spreadable to permit said balls to move outwards in said respective opposite sidewise holes (23);
   a threaded ring having a center hole in which said smaller diameter portion of said turning bar is rotatably received, said threaded ring engaging said third threaded portion (27) of said pipe supporter to hold said turning bar in said central bar hole (20) with said first threaded portion (11) of said turning bar engaged with said third threaded portion (27) of said pipe supporter;
   a handle which is threadably received in said first threaded sidewise hole (24) whereby said handle is useable to rotate said pipe supporter;
   a cutter for smoothing edges of a cut pipe, said cutter being threadably received in said second threaded sidewise hole (25); and
   a turning disc including an oval hole in which said oval upper end of said turning bar is received to secure said turning disc rotatably to said turning bar;
   such that a circumferential projection is formed in a pipe in which said tool is located by repeated rotation of said turning disc to move said tapered section downwardly and hence to force said balls further outwardly into engagement with the pipe and thereafter rotation of said pipe supporter with said handle.

2. A tool for forming a circumferential projection in a pipe comprising:
   a turning bar including a first threaded portion (11), a smaller diameter upper portion with an oval upper end, and a tapered portion (12) at a lower end thereof;
   a pipe supporter including
      (a) a central bar hole (20) in which said turning bar is received, said bar hole including (i) a second threaded portion (21) which engages said first threaded portion (11) of said turning bar and (ii) a third threaded portion (27) above said second threaded portion (21),
      (b) an upper part which remains outside of the pipe including (i) a first sidewise threaded hole (24), (ii) a second sidewise threaded hole (25), and (iii) a lowermost stair portion, and
      (c) a lower part which is received in the pipe including (i) two opposite sidewise holes (23) disposed to be opposite said tapered portion (12) of said turning bar, each said 1 opposite sidewise hole (23) having a steel ball disposed therein which is engageable by said tapered portion (12), (ii) a spring fitted about said lower part which is attached at an upper end thereof to said stair portion of said upper part, and (iii) a positioning ring located movably about said lower part and including a lower bottom to which is attached a lower end of said spring such that said positioning ring is normally positioned by said spring adjacent said opposite sidewise holes to prevent said balls from passing outward through a respective said opposite sidewise hole but said positioning ring is movable upwards to receive said spring therein as said lower part of said pipe supporter is received in the pipe;

a threaded ring having a center hole in which said smaller diameter portion of said turning bar is rotatably received, said threaded ring engaging said third threaded portion (27) of said pipe supporter to hold said turning bar in said central bar hole (20) with said first threaded portion (11) of said turning bar engaged with said third threaded portion (27) of said pipe supporter;

a handle which is threadably received in said first threaded sidewise hole (24) whereby said handle is useable to rotate said pipe supporter;

a cutter for smoothing edges of a cut pipe, said cutter being threadably received in said second threaded sidewise hole (25); and a turning disc including an oval hole in which said oval upper end of said turning bar is received to secure said turning disc rotatably to said turning bar;

such that a circumferential projection is formed in a pipe in which said tool is located by repeated rotation of said turning disc to move said tapered section downwardly and hence to force said balls further outwardly into engagement with the pipe and thereafter rotation of said pipe supporter with said handle.

* * * * *